(12) United States Patent
Amsinck et al.

(10) Patent No.: US 9,916,680 B2
(45) Date of Patent: Mar. 13, 2018

(54) LOW-POWER PROCESSING IN DEPTH READ-ONLY OPERATING REGIMES

(71) Applicant: NVIDIA Corporation, Santa Clara, CA (US)

(72) Inventors: Christian Amsinck, Durham, NC (US); Christian Rouet, San Rafael, CA (US); Tony Louca, Raleigh, NC (US)

(73) Assignee: NVIDIA CORPORATION, Santa Clara, CA (US)

( * ) Notice: Subject to any disclaimer, the term of this patent is extended or adjusted under 35 U.S.C. 154(b) by 947 days.

(21) Appl. No.: 13/651,329

(22) Filed: Oct. 12, 2012

(65) Prior Publication Data

US 2014/0104267 A1    Apr. 17, 2014

(51) Int. Cl.
  *G06T 15/40* (2011.01)
  *G06T 15/30* (2011.01)

(52) U.S. Cl.
  CPC ............ *G06T 15/405* (2013.01); *G06T 15/30* (2013.01); *G06T 15/40* (2013.01); *G06T 2200/28* (2013.01)

(58) Field of Classification Search
  None
  See application file for complete search history.

(56) References Cited

U.S. PATENT DOCUMENTS

| | | | | |
|---|---|---|---|---|
| 6,476,807 B1 * | 11/2002 | Duluk et al. | ................... | 345/421 |
| 2002/0196252 A1 * | 12/2002 | Liao | ........................ | G06T 15/40 345/422 |
| 2003/0122835 A1 * | 7/2003 | Doyle et al. | ................... | 345/537 |

* cited by examiner

*Primary Examiner* — Mark Zimmerman
*Assistant Examiner* — Nurun N Flora
(74) *Attorney, Agent, or Firm* — Artegis Law Group, LLP

(57) ABSTRACT

Techniques are disclosed for suppressing access to a depth processing unit associated with a graphics processing pipeline. The method includes receiving a graphics primitive from a first pipeline stage associated with the graphics processing pipeline. The method further includes determining that the graphics primitive is visible over one or more graphics primitives previously rendered to a frame buffer, and determining that the depth buffer is in a read-only mode. The method further includes suppressing an operation to transmit the graphics primitive to the depth processing unit. One advantage of the disclosed technique is that power consumption is reduced within the GPU by avoiding unnecessary accesses to the depth processing unit.

23 Claims, 7 Drawing Sheets

CONCEPTUAL DIAGRAM

CONCEPTUAL DIAGRAM

LOW-POWER PROCESSING IN DEPTH READ-ONLY OPERATING REGIMES

BACKGROUND OF THE INVENTION

Field of the Invention

The present invention generally relates to three-dimensional (3D) graphics processing, and, more particularly, to low-power processing in depth read-only operating regimes.

Description of the Related Art

As used in the field of computer graphics, 3D graphic processing units (GPUs) process geometric models that define objects, such as surfaces and polygons, in a three-dimensional scene and light sources that illuminate these objects. The GPU converts these geometric models into images that include a large number of picture elements (pixels) stored in a frame buffer. During this process, the GPU alters the color and brightness of each object, surface, and polygon in the 3D scene, based on a number of factors, including the angle and distance of an object to each light source, surface characteristics of the object, and so on, to create a photorealistic image of the 3D scene. Such a process is called shading. In addition, the frame buffer typically includes depth (Z) data in a depth buffer indicating the distance of each pixel from the surface of the display device.

Because shading is a computationally expensive process, modern GPUs perform a number of tests early during the processing of a 3D scene to determine if some objects are partially or completely occluded by other objects. The portion of an object that is occluded by one or more other objects is not seen in the final image, and that portion of the object does not need shading. One such early test, known as Z-cull optimization, improves performance by avoiding the rendering of occluded surfaces. With Z-cull optimization, the GPU performs a coarse level depth and stencil culling. If the GPU determines that a portion of an object is not visible, then that portion of the object is not shaded or stored in the frame buffer. If the GPU determines that a portion of the object is visible, then that portion of the object passes to other portions of the GPU for shading and further processing. After shading, the image and depth information associated with the visible portion of the object is stored in the frame buffer.

In some cases, a visible portion of the object may affect the image data portion of the frame buffer, but not the depth portion. Typically, such a determination is made by a depth processing unit, also known as a Z-raster operations (ZROP) unit. The depth processing unit performs a depth test to determine whether the object is visible and whether the depth buffer is updated. One problem with this approach is that the depth processing unit is accessed even under circumstances where a depth test is unnecessary and where the depth buffer is not updated. Such unnecessary accesses consume power within the GPU and consume a portion of the available internal bandwidth to the depth processing unit and bandwidth to the depth buffer, leaving less bandwidth for other components within the GPU.

As the foregoing illustrates, what is needed in the art is an improved technique for processing depth information in a 3D graphics pipeline.

SUMMARY OF THE INVENTION

One embodiment of the present invention sets forth a method for suppressing access to a depth processing unit associated with a graphics processing pipeline. The method includes receiving a graphics primitive from a first pipeline stage associated with the graphics processing pipeline. The method further includes determining that the graphics primitive is visible over one or more graphics primitives previously rendered to a frame buffer, and determining that the depth buffer is in a read-only mode. The method further includes suppressing an operation to transmit the graphics primitive to the depth processing unit.

Other embodiments include, without limitation, a subsystem that includes a first device configured to implement one or more aspects of the disclosed methods as well as a system configured to implement one or more aspects of the disclosed methods.

One advantage of the disclosed technique is that power consumption is reduced within the GPU by avoiding unnecessary accesses to the depth processing unit. In addition, by reducing internal data transfer across shared resources, such as the depth processing unit, more internal bandwidth is available for other GPU components.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
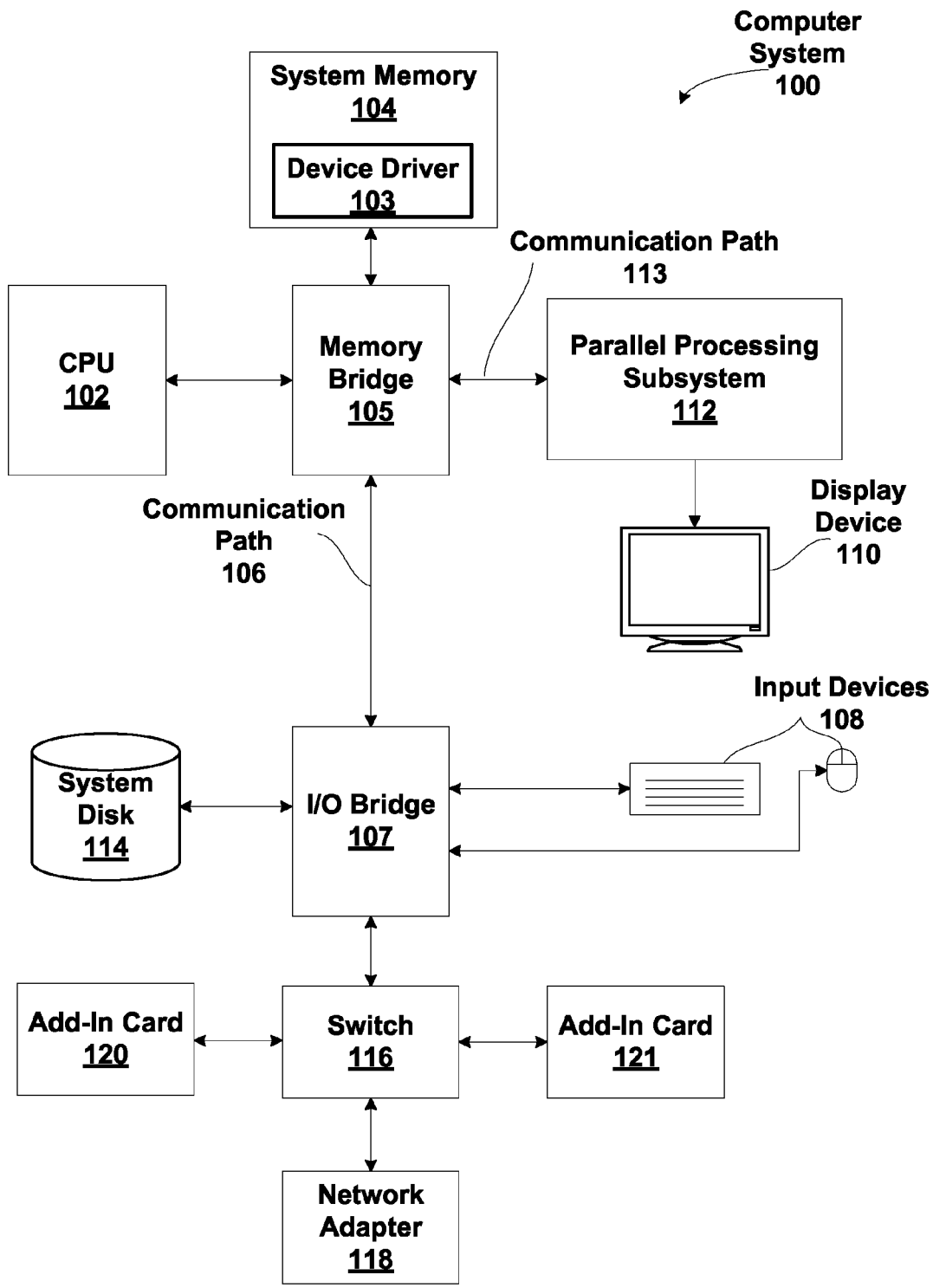
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), Hyper-Transport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
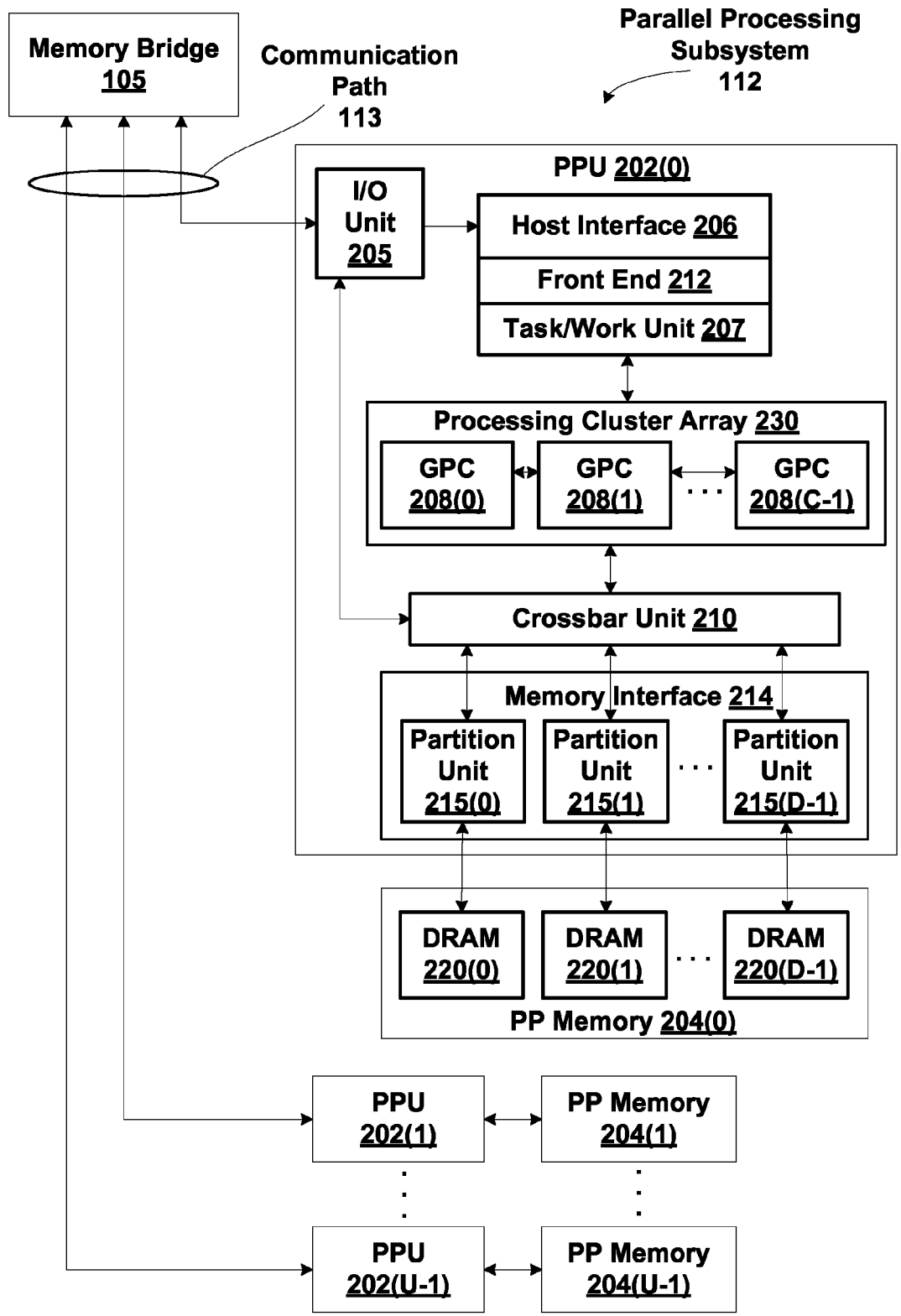
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Task Processing Overview

Figure 3:
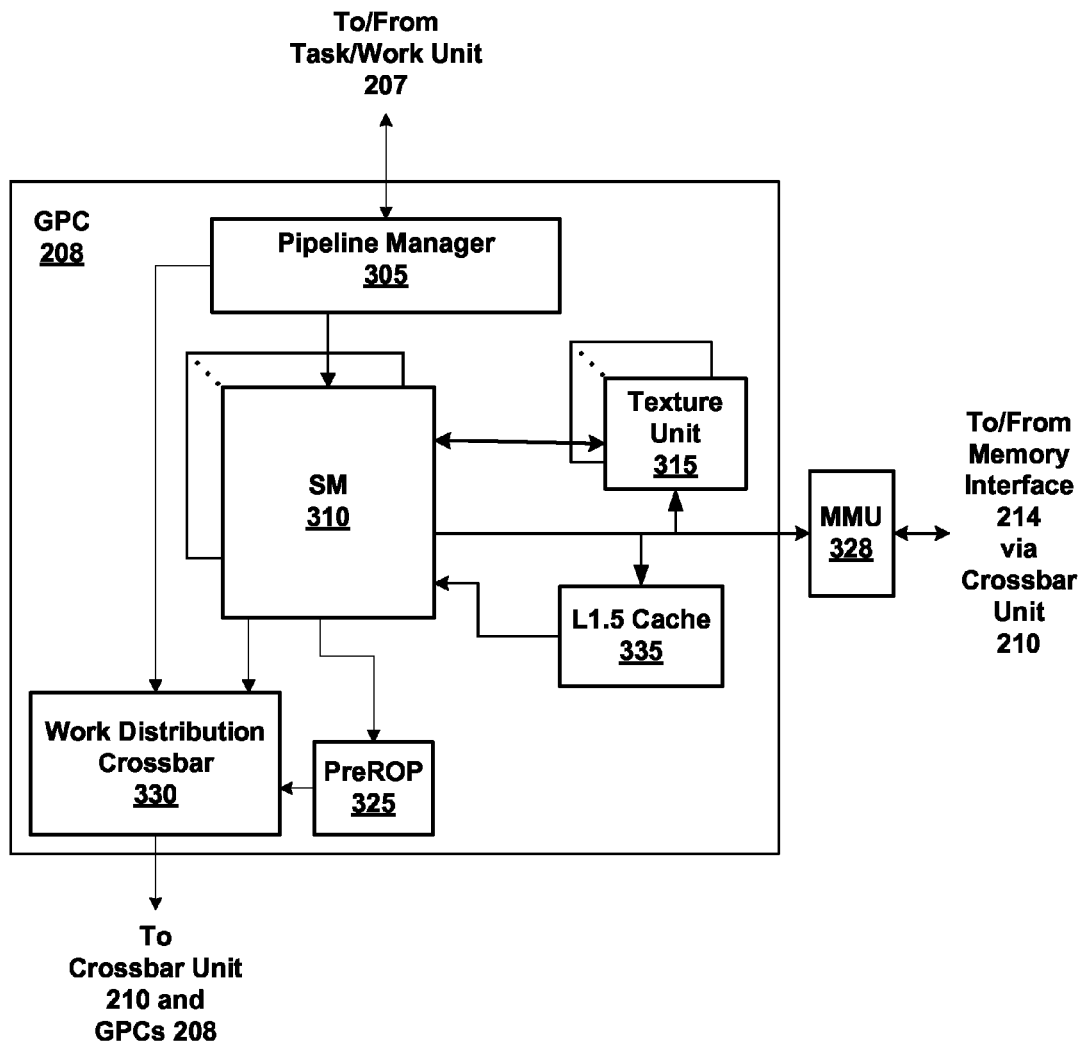
FIG. 3 is a block diagram of a general processing cluster within one of the parallel processing units of FIG. 2, according to one embodiment of the present invention.

FIG. 3 is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—not shown) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines are idle during cycles when that thread group is being processed. A thread group may also include more threads than the number of processing engines within the SM 310, in which case processing takes place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (not shown) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1-3 in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAS, the threads of a CTA might or might not actually share data with each other, depending on the CTA program, and the terms "CTA" and "thread array" are used synonymously herein.

Graphics Pipeline Architecture

Figure 4:
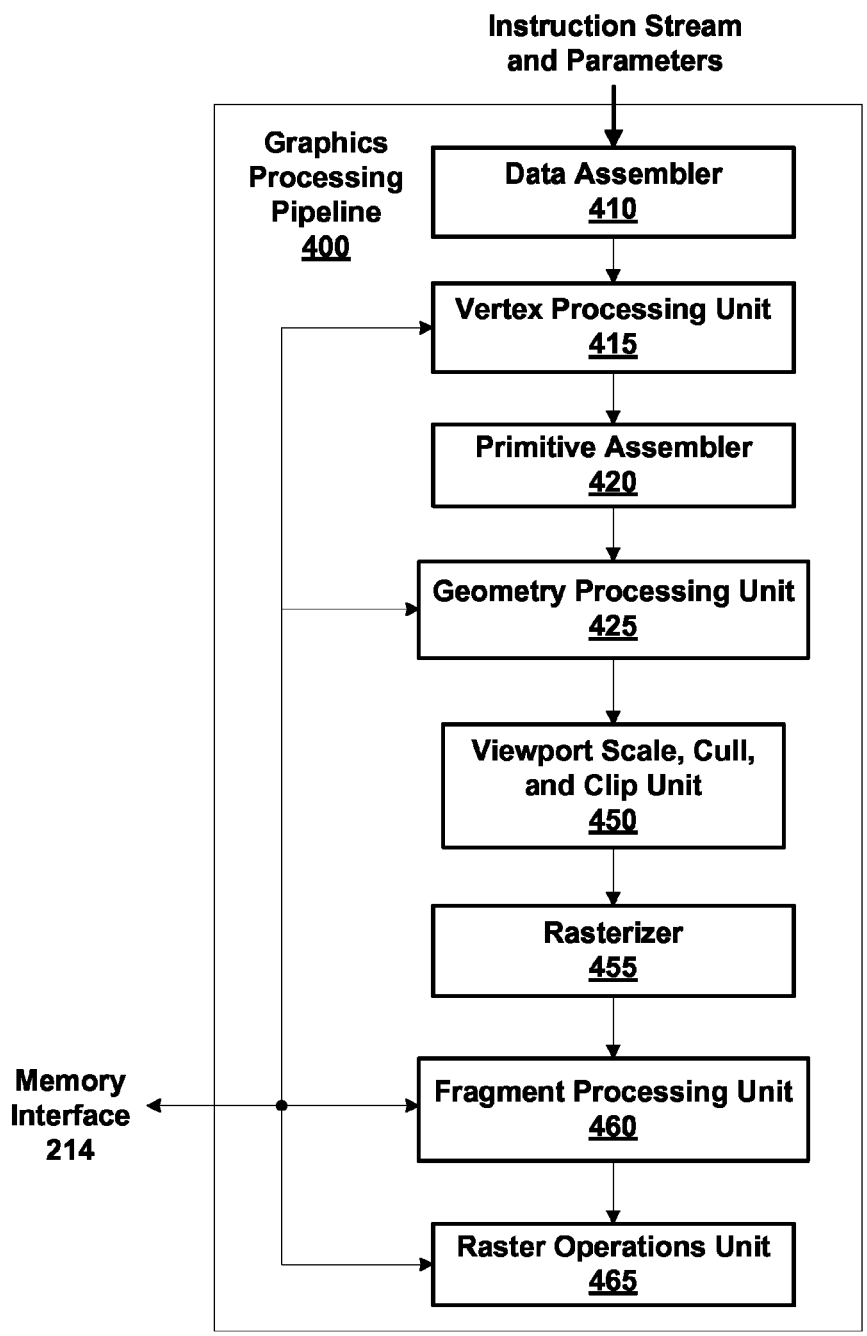
FIG. 4 is a conceptual diagram of a graphics processing pipeline that one or more of the parallel processing units of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache (not shown), parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Suppression of Depth Buffer Access

Figure 5:
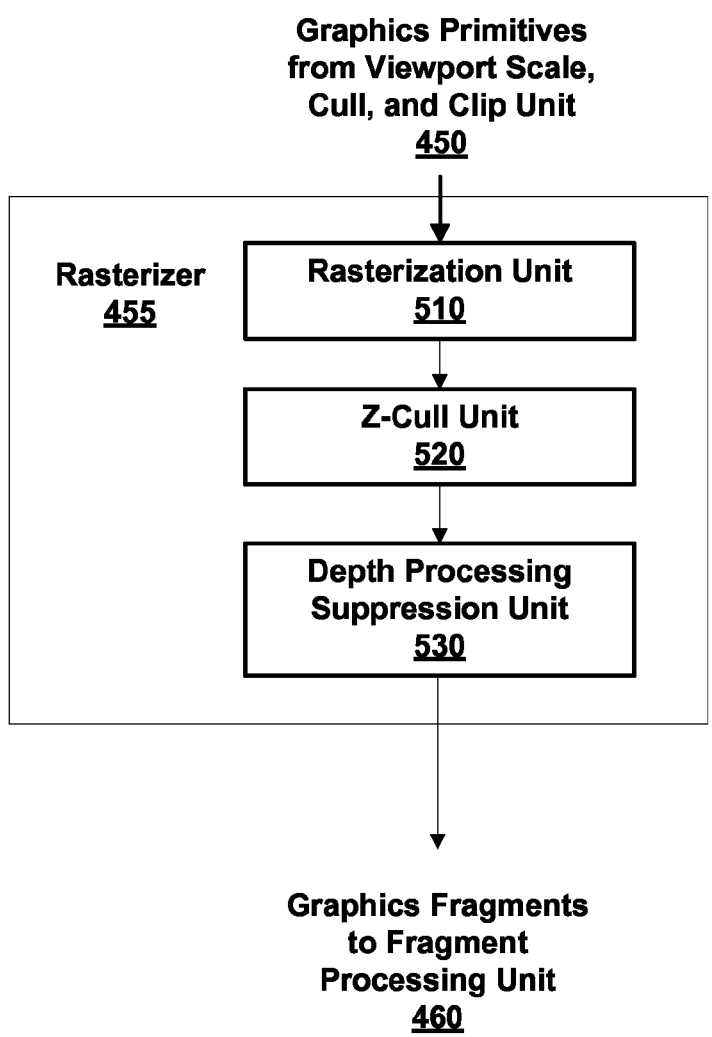
FIG. 5 illustrates the rasterizer of FIG. 4, according to one embodiment of the present invention.

FIG. 5 illustrates the rasterizer 455 of FIG. 4, according to one embodiment of the present invention. As shown, the rasterizer 455 includes a rasterization unit 510, a depth culling (Z-cull) unit 520, and a depth processing suppression unit 530.

The rasterization unit 510 calculates which pixels in the frame buffer are covered by each graphics primitive, or, in the case where multisampling is enabled, which samples are covered by each graphics primitive. The rasterization unit 510 receives graphics primitives from the viewport scale, cull, and clip unit 450, where the geometry primitives are determined to be within a defined viewport associated with a display device. The rasterization unit 510 transmits pixels, samples, or fragments that include multiple pixels or samples, to the Z-cull unit 520.

The Z-cull unit 520 discard pixels (or samples) that are occluded by objects rendered into the frame buffer that are closer to the screen surface of a display device than the pixels or samples. In some embodiments, objects are closer to the to the screen surface of a display device where the depth value stored in the depth buffer is less than the corresponding depth value of the pixel or sample. In one embodiment, the Z-cull unit 520 is associated with a proxy (not shown) of the depth buffer, where the proxy has lower resolution than the actual depth buffer. The Z-cull unit 520 may compare the depth value of the pixels received from the rasterization unit 520 with the corresponding depth values in the depth buffer proxy.

In one example, the Z-cull unit 520 could determine that a pixel, sample, or fragment is complete occluded by the geometry previously rendered into the frame buffer. In such a case, the Z-cull unit 520 would discard the pixel, sample, or fragment, such that the pixel, sample, or fragment to prevent further processing by later stages in the graphics processing pipeline 400. In another example, the Z-cull unit 520 could determine that an ambiguity exists where the Z-cull unit 520 could not determine whether the pixel, sample, or fragment is occluded by previously rendered geometry or not. In such a case, the Z-cull unit 520 would transmit the pixel, sample, or fragment for further processing by later stages in the graphics processing pipeline 400. In yet another example, the Z-cull unit 520 could determine that a pixel, sample, fragment, or portions thereof is completely visible and, therefore, would be rendered into the frame buffer. In such a case, the Z-cull unit 520 would transmit the pixel, sample, or fragment to the depth processing suppression unit 530.

The depth processing suppression unit 530 determines whether access to the depth processing unit (not shown) is suppressed for pixels, samples, and fragments determined to be visible by the Z-cull unit 520. In one embodiment, the depth processing unit is including in the raster operations unit 465. The depth processing suppression unit 530 receives pixels, samples, and fragments from the Z-cull unit 520. If the Z-cull unit 520 determines that a pixel, sample, or fragment is visible, then the depth processing suppression unit 530 performs additional testing to determine whether to suppress an access to the depth processing unit, where the access is associated with the pixel, sample, fragment, or portions thereof. Such additional tests include determining that the graphics primitive is acceptable for writing to the frame buffer and determining that the depth buffer is in a read-only mode. If the graphics primitive passes the relevant tests, then the depth processing suppression unit 530 suppresses the access to the depth processing unit associated with the pixel, sample, or fragment.

In some embodiments, determining that the graphics primitive is acceptable for writing to the frame buffer may include determining that the graphics primitive passes one or more tests. Those various tests include, without limitation, a clip test, a depth bounds test, a stencil test, a depth test, and determining that a depth buffer clear operation is not included with the graphics primitive, where a depth buffer initializes a depth value in the depth buffer to a specific value. A clip test may include determining that the range of depth values associated with the graphics primitive falls within certain bounds. A depth bounds test may include determining that a range of depth values associated with the graphics primitive is closer to a screen surface of a display device than a range of corresponding depth values associated with the depth buffer. A stencil test may include determining that the graphics primitive is visible through a stencil pattern associated with the depth buffer. A depth test may include determining that a depth value associated with the graphics primitive is closer to a screen surface of a display device than a corresponding depth value associated with the depth buffer. Also, in some embodiments, determining that the depth buffer is in a read-only mode may include determining that the graphics primitive is not associated with a depth buffer write operation. In addition, in some embodiments, the depth processing suppression unit 530 performs additional tests that include, without limitation, determining that a depth value in the depth buffer that is associated with the graphics primitive is unchanged as a result of processing the graphics primitive, and determining that a stencil value in the depth buffer that is associated with the graphics primitive is unchanged as a result of processing the graphics primitive.

If the depth processing suppression unit 530 determines that the access to the depth processing unit is to be suppressed, then the depth processing suppression unit 530 passes the pixel data to the fragment processing unit 460 and inhibits transmission of the pixel data to the depth processing unit. In such a case, the fragment is not forwarded to the depth processing unit inside the raster operations unit 465. If the depth processing suppression unit 530 determines that the access to the depth processing unit is not to be suppressed, then the depth processing suppression unit 530 passes the pixel data and the associated depth data to the fragment processing unit 460 and to the depth processing unit.

In one example, about 20% of the pixels, samples, and fragments could be associated with a Z-read only mode, and about 32% of the pixels, samples, and fragments in the Z-read only mode could be determined to be visible by the Z-cull unit 520. In such a case, the depth processing suppression unit 530 would reduce the processing performed by the depth processing unit by approximately 6.4% (20% X 32%). If the Z-cull unit 520 is not able to determine whether a pixel, sample, or fragment is visible or not, then the depth processing suppression unit 530 passes the pixel, sample, or fragment to the fragment processing unit 460 without additional testing.

It will be appreciated that the architecture described herein is illustrative only and that variations and modifications are possible. For example, although the depth processing suppression unit 530 is illustrated as following Z-cull unit 520 in the rasterizer 455, the depth processing suppression unit 530 could be placed in any technically feasible location within the graphics processing pipeline 400, including, in the rasterizer 455 after the Z-cull unit 520, in the fragment processing unit 460, or in the raster operations unit 465 prior to the depth processing unit. In another example, although described in the context of accesses to a frame buffer and an associated depth buffer, the techniques disclosed herein could be used in conjunction with any suitable render target or memory, whether or not the render target or memory is classified as a frame buffer or depth buffer.

Figure 6A:
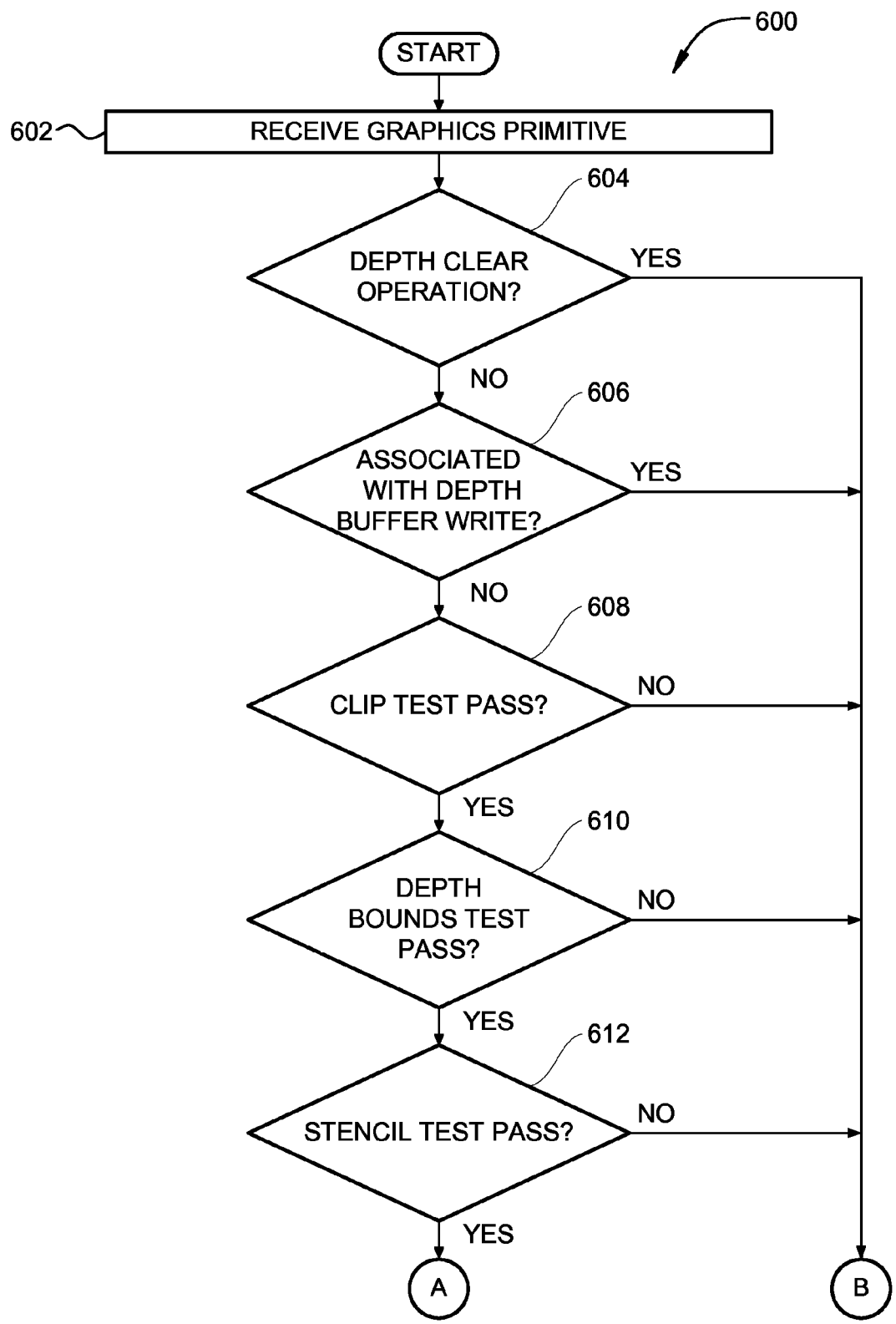
FIGS. 6A and 6B set forth a flow diagram of method steps depicting suppression of depth buffer accesses, according to one embodiment of the present invention.
Figure 6B:
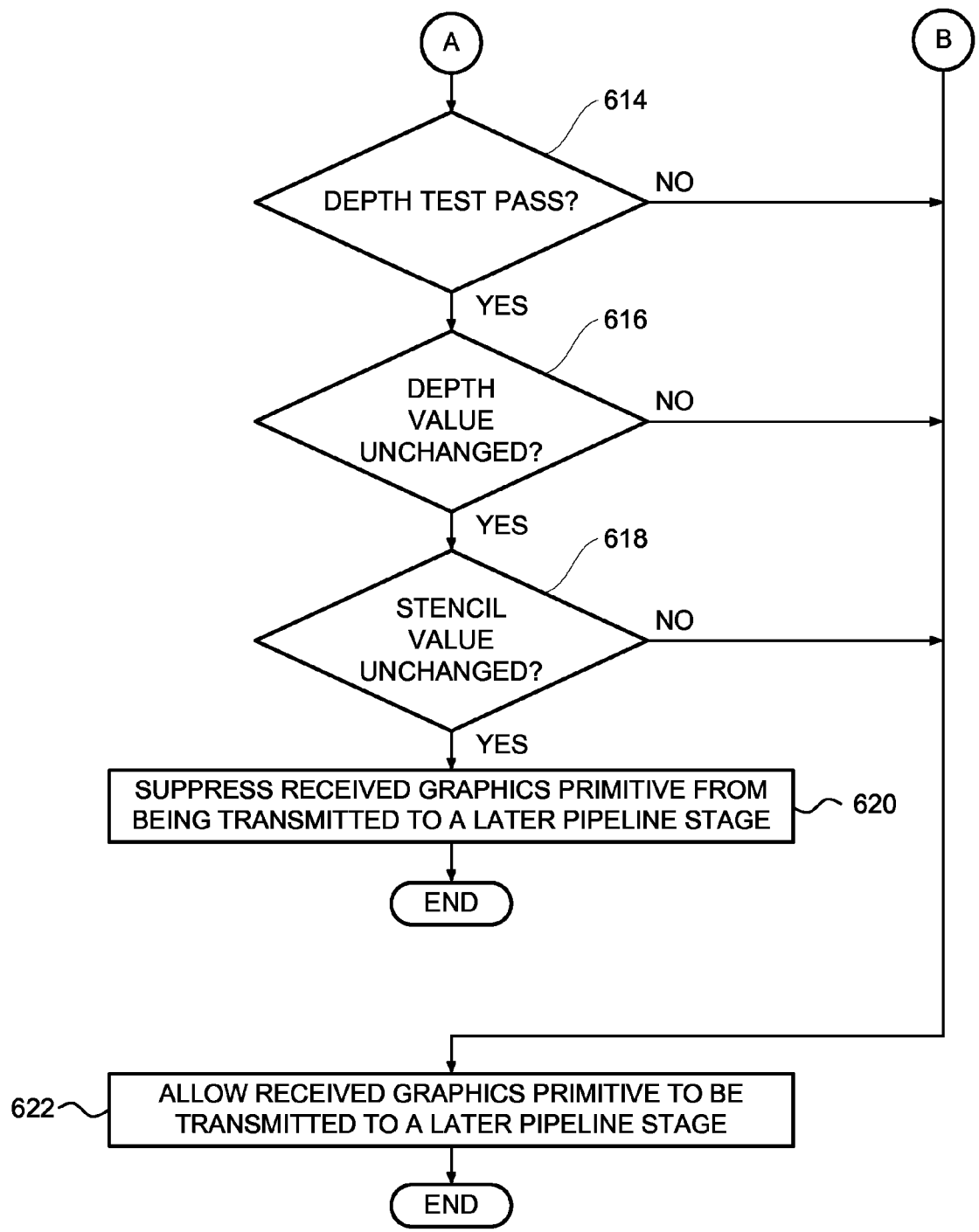

FIGS. 6A and 6B set forth a flow diagram of method steps depicting suppression of depth buffer accesses, according to one embodiment of the present invention. Although the method steps are described in conjunction with the systems of FIGS. 1-5, persons of ordinary skill in the art will understand that any system configured to perform the method steps, in any order, is within the scope of the inventions.

The method 600 begins at step 602, where the depth processing suppression unit 530 receives a graphics primitive from a prior pipeline stage in the graphics processing pipeline 400. In one example, the depth processing suppression unit 530 could receive a graphics primitive from the Z-cull unit 520 in the rasterizer 455. At step 604, the depth processing suppression unit 530 determines whether the received graphics primitive is associated with a depth buffer clear operation. If the graphics primitive is associated with a depth buffer clear operation, then the method 600 proceeds to step 622, where the depth processing suppression unit 530 allows the received graphics primitive to be transmitted to a later pipeline stage in the graphics processing pipeline 400 for further processing. In one example, the depth processing suppression unit 530 could allow the received graphics primitive to be transmitted to the fragment processing unit 460. In another example, the depth processing suppression unit 530 could allow the received graphics primitive to be transmitted to the depth processing unit in the raster operations unit 465. The method 600 then terminates.

If, at step 604, the graphics primitive is not associated with a depth buffer clear operation, then the method 600 proceeds to step 606, where, the depth processing suppression unit 530 determines whether the received graphics primitive is associated with a depth buffer write operation. If the received graphics primitive is associated with a depth buffer write operation, then the method 600 proceeds to step 622, described above.

If the received graphics primitive is not associated with a depth buffer write operation, then the method 600 proceeds to step 608, where the depth processing suppression unit 530 determines whether the graphics primitive passes a clip test. For example, the depth processing suppression unit 530 could determine that a depth value associated with the graphics primitive falls within a certain range. If the graphics primitive does not pass the clip test, then the method 600 proceeds to step 622, described above.

If the graphics primitive does pass the clip test, then the method 600 proceeds to step 610, where the depth processing suppression unit 530 determines whether the graphics primitive passes a depth bounds test. For example, the depth processing suppression unit 530 could determine whether a range of depth values associated with the graphics primitive is closer to a screen surface of a display device than a range of corresponding depth values associated with the depth buffer. If the graphics primitive does not pass the depth bounds test, then the method 600 proceeds to step 622, described above.

If the graphics primitive does pass the depth bounds test, then the method 600 proceeds to step 612, where the depth processing suppression unit 530 determines whether the graphics primitive passes a stencil test. For example, the depth processing suppression unit 530 could determine whether the graphics primitive is visible through a stencil pattern associated with the depth buffer. If the graphics primitive does not pass the stencil test, then the method 600 proceeds to step 622, described above.

If the graphics primitive does pass the stencil test, then the method 600 proceeds to step 614, where the depth processing suppression unit 530 determines whether the graphics primitive passes a depth test. For example, the depth processing suppression unit 530 could determine whether a depth value associated with the graphics primitive is closer to a screen surface of a display device than a corresponding depth value associated with the depth buffer. If the graphics primitive does not pass the depth test, then the method 600 proceeds to step 622, described above.

If the graphics primitive does pass the depth test, then the method 600 proceeds to step 616, where the depth processing suppression unit 530 determines whether a depth value in the depth buffer that is associated with the graphics primitive remains substantially unchanged by the graphics primitive. If the depth value is substantially changed, then the method 600 proceeds to step 622, described above. If, however, the depth value remains substantially unchanged, then the method 600 proceeds to step 618, where the depth processing suppression unit 530 determines whether a stencil value in the depth buffer that is associated with the graphics primitive remains substantially unchanged by the graphics primitive. If the depth value is substantially changed, then the method 600 proceeds to step 622, described above.

If the stencil value remains substantially unchanged, then the method 600 proceeds to step 620, where the depth processing suppression unit 530 suppresses the received graphics primitive from being transmitted from a prior pipeline stage to a later pipeline stage in the graphics processing pipeline 400. In one example, the depth processing suppression unit 530 could suppress the received graphics primitive from being transmitted to the fragment processing unit 460. In another example, the depth processing suppression unit 530 could suppress the received graphics primitive from being transmitted to the depth processing unit in the raster operations unit 465. The method 600 then terminates.

In sum, accesses to the depth processing unit are suppressed for portions of a graphics object that are (i) known to be visible, and (ii) for which the depth buffer is not written. In particular, the depth buffer is not written when the depth buffer is in a depth read-only mode, where there is no update to the depth buffer. In such a read-only mode, the depth processing unit is bypassed if a portion of the object is previously determined to be accepted by the frame buffer. As a result, the depth processing unit is not accessed when the GPU determines in advance that the depth buffer does not need to be read from to determine the test results of the current graphics object because the graphics object is determined in advance to be visible.

One advantage of the disclosed technique is that power consumption is reduced within the GPU by avoiding unnecessary accesses to the depth processing unit. In addition, by reducing depth buffer accesses, more internal bandwidth is available for other GPU components.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A method for suppressing depth buffer accesses within a graphics processing pipeline, the method comprising:
receiving a graphics primitive from a first pipeline stage associated with the graphics processing pipeline;
determining that the graphics primitive is visible over one or more graphics primitives previously rendered to a frame buffer;
determining that a depth buffer is in a read-only mode; and
in response to determining that the graphics primitive is visible and that the depth buffer is in a read-only mode, suppressing an operation to transmit the graphics primitive to a subsequent pipeline stage associated with the graphics processing pipeline,
wherein the steps of receiving and suppressing are performed while processing the graphics primitive during a single pass through the graphics processing pipeline.

2. The method of claim 1, wherein determining that the graphics primitive is visible over one or more graphics primitives previously rendered to a frame buffer comprises determining that a range of depth values associated with the graphics primitive is closer to a screen surface of a display device than a range of corresponding depth values associated with the depth buffer.

3. The method of claim 1, wherein determining that the graphics primitive is visible over one or more graphics primitives previously rendered to a frame buffer comprises determining that the graphics primitive is visible through a stencil pattern associated with the depth buffer.

4. The method of claim 1, wherein determining that the graphics primitive is visible over one or more graphics primitives previously rendered to a frame buffer comprises determining that a depth value associated with the graphics primitive is closer to a screen surface of a display device than a corresponding depth value associated with the depth buffer.

5. The method of claim 1, wherein determining that the graphics primitive is visible over one or more graphics primitives previously rendered to the frame buffer comprises determining that a depth value associated with the graphics primitive falls within a certain range.

6. The method of claim 1, further comprising determining that a depth value in the depth buffer that is associated with the graphics primitive remains substantially unchanged by the graphics primitive.

7. The method of claim 1, further comprising determining that a stencil value in the depth buffer that is associated with the graphics primitive remains substantially unchanged by the graphics primitive.

8. The method of claim 1, wherein determining that the depth buffer is in a read-only mode comprises determining that the graphics primitive is not associated with a depth buffer clear operation or a depth buffer write operation.

9. The method of claim 1, wherein the subsequent pipeline stage comprises a Z-raster operations (ZROP) unit or a fragment processing unit.

10. A subsystem, comprising:
a memory that includes a frame buffer; and
a rasterizer configured to suppress depth buffer accesses within a graphics processing pipeline by performing the steps of:
receiving a graphics primitive from a first pipeline stage associated with the graphics processing pipeline;
determining that the graphics primitive is visible over one or more graphics primitives previously rendered to the frame buffer;
determining that the depth buffer is in a read-only mode; and
in response to determining that the graphics primitive is visible and that the depth buffer is in a read-only mode, suppressing an operation to transmit the graphics primitive to a subsequent pipeline stage associated with the graphics processing pipeline,
wherein the steps of receiving and suppressing are performed while processing the graphics primitive during a single pass through the graphics processing pipeline.

11. The subsystem of claim 10, wherein determining that the graphics primitive is visible over one or more graphics primitives previously rendered to a frame buffer comprises determining that a range of depth values associated with the graphics primitive is closer to a screen surface of a display device than a range of corresponding depth values associated with the depth buffer.

12. The subsystem of claim 10, wherein determining that the graphics primitive is visible over one or more graphics primitives previously rendered to a frame buffer comprises determining that the graphics primitive is visible through a stencil pattern associated with the depth buffer.

13. The subsystem of claim 10, wherein determining that the graphics primitive is visible over one or more graphics primitives previously rendered to a frame buffer comprises determining that a depth value associated with the graphics primitive is closer to a screen surface of a display device than a corresponding depth value associated with the depth buffer.

14. The subsystem of claim 10, wherein determining that the graphics primitive is visible over one or more graphics primitives previously rendered to the frame buffer comprises determining that a depth value associated with the graphics primitive falls within a certain range.

15. The subsystem of claim 10, wherein the rasterizer is further configured to perform the step of determining that a depth value in the depth buffer that is associated with the graphics primitive remains substantially unchanged by the graphics primitive.

16. The subsystem of claim 10, wherein the rasterizer is further configured to perform the step of determining that a stencil value in the depth buffer that is associated with the graphics primitive remains substantially unchanged by the graphics primitive.

17. The subsystem of claim 10, wherein determining that the depth buffer is in a read-only mode comprises determining that the graphics primitive is not associated with a depth buffer clear operation or a depth buffer write operation.

18. The subsystem of claim 10, wherein the subsequent pipeline stage comprises a Z-raster operations (ZROP) unit or a fragment processing unit.

19. A system, comprising:
a memory that includes a frame buffer; and
a graphics processing pipeline that includes a first pipeline stage, a rasterizer and a subsequent pipeline stage, wherein the rasterizer:
receives a graphics primitive from the first pipeline stage;
determines that the graphics primitive is visible over one or more graphics primitives previously rendered to the frame buffer;
determines that the depth buffer is in a read-only mode; and in response to determining that the graphics primitive is visible and that the depth buffer is in a read-only mode, suppresses an operation to transmit the graphics primitive to the subsequent pipeline stage, wherein the rasterizer performs the steps of receiving and suppressing while processing the graphics primitive during a single pass through the graphics processing pipeline.

20. The system of claim 19, wherein the rasterizer determines that the graphics primitive is visible over one or more graphics primitives previously rendered to a frame buffer by determining that a range of depth values associated with the graphics primitive is closer to a screen surface of a display device than a range of corresponding depth values associated with the depth buffer.

21. The method of claim 1, wherein the graphics primitive further comprises one or more vertex attributes that correspond to a plurality of vertices.

22. The method of claim 1, wherein suppressing an operation to transmit the graphics primitive to the subsequent pipeline stage comprises passing pixel data associated with the graphics primitive to a fragment processing unit and inhibiting transmission of the pixel data to a Z-raster operations (ZROP) unit.

23. The method of claim 1, wherein the operation to transmit the graphics primitive to the subsequent pipeline stage is performed in response to determining that the graphics primitive is visible over one or more graphics primitives previously rendered to the frame buffer and determining that depth buffer is in a read-only mode.

* * * * *